United States Patent
Naitoh

(10) Patent No.: US 8,488,147 B2
(45) Date of Patent: Jul. 16, 2013

(54) MONITORING APPARATUS, IMAGE FORMING APPARATUS, MONITORING SYSTEM, METHOD OF CHANGING NETWORK SETTING, AND PROGRAM

(75) Inventor: Yoshiko Naitoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1289 days.

(21) Appl. No.: 11/851,305

(22) Filed: Sep. 6, 2007

(65) Prior Publication Data

US 2008/0137125 A1    Jun. 12, 2008

(30) Foreign Application Priority Data

Dec. 8, 2006 (JP) .................................. 2006-332177

(51) Int. Cl.
  G06K 15/02    (2006.01)
  G06F 15/00    (2006.01)

(52) U.S. Cl.
  USPC .......... 358/1.15; 709/221; 709/223; 709/250; 710/8; 710/9

(58) Field of Classification Search
  USPC .............. 358/1.15; 709/221, 223, 250; 710/8, 710/9
  See application file for complete search history.

(56) References Cited

U.S. PATENT DOCUMENTS

| | | | |
|---|---|---|---|
| 5,638,497 A | 6/1997 | Kimber et al. | |
| 6,178,004 B1 | 1/2001 | Ochiai | |
| 6,725,401 B1* | 4/2004 | Lindhorst-Ko | 714/47.3 |
| 2002/0157018 A1* | 10/2002 | Syvanne | 713/200 |
| 2004/0137897 A1 | 7/2004 | Teixeira | |
| 2006/0002352 A1 | 1/2006 | Nakamura | |
| 2006/0232819 A1* | 10/2006 | Kasamatsu | 358/1.15 |

FOREIGN PATENT DOCUMENTS

JP    2001-251337 A    9/2001

OTHER PUBLICATIONS

Configuring Networks and Devices with Simple Network Management Protocol (SNMP), Network Working Group, M. MacFaden, et al., Apr. 2003, pp. 1-78.

* cited by examiner

*Primary Examiner* — Peter K Huntsinger
(74) *Attorney, Agent, or Firm* — Canon U.S.A., Inc. IP Division

(57) ABSTRACT

To quickly repair a communication breakdown, a monitoring apparatus receives a notification of change of a network setting from an image forming apparatus. After receiving the notification of the change of the network setting, the monitoring apparatus determines whether a notification of completion of the change of the network setting is received within a predetermined period of time. In the case where it is determined that no notification of the completion of the change of the network setting is received within the predetermined period of time after receipt of the notification of the change of the network setting, the monitoring apparatus sends a notification of a failure in the network setting.

11 Claims, 12 Drawing Sheets

| ID | SENDING ADDRESS | PRODUCT NAME | CUSTOMER ID |
|---|---|---|---|
| ABC00001 | service01@abc.co.jp | LBP-1 | 10000 |
| ABC00123 | service02@xyz.co.jp | LBP-1 | 10200 |
| RTR10003 | service03@abc.co.jp | MFP-1 | 10000 |

FIG. 5A

```
<?xml version='1.0' encoding='UTF-8'?>
<SOAP-ENV:Envelope
xmlns:SOAP-ENV="http://schemas.xmlsoap.org/soap/envelope/"
xmlns:xsi="http://www.w3.org/2001/XMLSchema-instance"
xmlns:xsd="http://www.w3.org/2001/XMLSchema">
<SOAP-ENV:Body>
<ns1:postNetworkSettings xmlns:ns1="server"
SOAP-ENV:encodingStyle="http://schemas.xmlsoap.org/soap/encoding/">
<device xsi:type="ns2:deviceIdentityType"
xmlns:ns2="http://www.xxxx.com/ns/active/ maintenance ">
<serialNumber xsi:type="xsd:string">ABC00001</serialNumber>
<ip xsi:type="xsd:string">10.1.1.2</ip>
<gateway xsi:type="xsd:string">10.1.0.12</gateway>
<dns xsi:type="xsd:string">10.1.0.16</dns>
<proxy xsi:type="xsd:string">10.2.1.1</proxy>
<wins xsi:type="xsd:string">10.1.100.2</wins>
<ipNew xsi:type="xsd:string">10.1.1.2</ip>
<gatewayNew xsi:type="xsd:string">10.1.0.12</gateway>
<dnsNew xsi:type="xsd:string">10.1.0.16</dns>
<proxyNew xsi:type="xsd:string">10.2.1.5</proxy>
<winsNew xsi:type="xsd:string">10.1.100.2</wins>
</device>
<timeStamp xsi:type="xsd:dateTime">
2005-12-21T13:40:05.000Z
</timeStamp>
</ns1:postNetworkSettings>
</SOAP-ENV:Body>
</SOAP-ENV:Envelope>
```

FIG. 5B

```
<?xml version='1.0' encoding='UTF-8' ?>
<SOAP-ENV:Envelope
xmlns:SOAP-ENV="http://schemas.xmlsoap.org/soap/envelope/"
xmlns:xsi="http://www.w3.org/2001/XMLSchema-instance"
xmlns:xsd="http://www.w3.org/2001/XMLSchema">
<SOAP-ENV:Body>
<ns1:postNetworkSettings xmlns:ns1="server"
SOAP-ENV:encodingStyle="http://schemas.xmlsoap.org/soap/encoding/">
<device xsi:type="ns2:deviceIdentityType"
xmlns:ns2="http://www.xxxx.com/ns/active/ maintenance ">
<serialNumber xsi:type="xsd:string">ABC00001</serialNumber>
</device>
<timeStamp xsi:type="xsd:dateTime">
2005-12-21T13:40:05.000Z
</timeStamp>
</ns1:postNetworkSettings>
</SOAP-ENV:Body>
</SOAP-ENV:Envelope>
```

FIG. 6

| NUMBER OF APPARATUSES WAITING FOR COMPLETION | | | | |
|---|---|---|---|---|
| | | | | |
| ID | SETTING VALUES BEFORE CHANGE | SETTING VALUES AFTER CHANGE | MONITORING START TIME | MONITORING END TIME |
| | | | | |

FIG. 7

NETWORK SETTING ☒

IP ADDRESS: 10. 1. 1. 2

GATEWAY ADDRESS: 10. 1. 1. 12

DNS SERVER ADDRESS: 10. 1. 1. 16

PROXY SERVER ADDRESS: 10. 2. 1. 5

WINS SERVER ADDRESS: 10. 1. 100. 2

OK   CANCEL

FIG. 10

COMMUNICATION WITH SERIAL NUMBER: ABC0001 HAS BEEN DISABLED AFTER CHANGE OF NETWORK SETTING.

[SETTING BEFORE CHANGE]     [SETTING AFTER CHANGE]

| | BEFORE | | AFTER |
|---|---|---|---|
| IP ADDRESS: | 10. 1. 1. 2 | | 10. 1. 1. 2 |
| GATEWAY ADDRESS: | 10. 1. 0. 12 | | 10. 1. 0. 12 |
| DNS SERVER ADDRESS: | 10. 1. 0. 16 | | 10. 1. 0. 16 |
| PROXY SERVER ADDRESS: | 10. 2. 1. 1 | >>>>>>> | 10. 2. 1. 5 |
| WINS SERVER ADDRESS: | 10. 1. 100. 2 | | 10. 1. 100. 2 |

INCORRECT CHANGE OF NETWORK SETTING MAY HAVE CAUSED COMMUNICATION FAILURE.
PLEASE ASK SERVICE MAN FOR ASSISTANCE.

FIG. 11A

| NETWORK SETTING | ☒ |
|---|---|

| IP ADDRESS: | 10. 1. 1. 2 |
| GATEWAY ADDRESS: | 10. 1. 0. 12 |
| DNS SERVER ADDRESS: | 10. 1. 0. 16 |
| PROXY SERVER ADDRESS: | 10. 2. 1. 5 |
| WINS SERVER ADDRESS: | 10. 1. 100. 2 |

[ OK ]  [ CANCEL ]  [ DETAILS >> ]

FIG. 11B

DETAILED SETTING ☒

◉ IMMEDIATE CHANGE

◉ IMMEDIATE NOTIFICATION OF COMPLETION OF CHANGE

○ DELAYED NOTIFICATION OF COMPLETION OF CHANGE
      NOTIFICATION TIME AND DATE [         ]

○ RESERVED CHANGE    CHANGE TIME AND DATE [         ]

○ IMMEDIATE NOTIFICATION OF COMPLETION OF CHANGE AFTER CHANGE

○ DELAYED NOTIFICATION OF COMPLETION OF CHANGE AFTER CHANGE
      NOTIFICATION TIME AND DATE [         ]

[ OK ]  [ CANCEL ]

MONITORING APPARATUS, IMAGE FORMING APPARATUS, MONITORING SYSTEM, METHOD OF CHANGING NETWORK SETTING, AND PROGRAM

BACKGROUND OF THE INVENTION

1. Field of the Invention

The present invention relates to a monitoring apparatus configured to monitor an image forming apparatus, the image forming apparatus monitored by the monitoring apparatus, and a monitoring system including the image forming apparatus and the monitoring apparatus.

2. Description of the Related Art

A known system for monitoring success or failure of change of a network setting and recovering the original setting in case of failure is available.

Japanese Patent Laid-Open No. 2001-251337 discloses a system in which a device instructed by a server to change its network setting recovers the network setting values before the change in the case where no instruction is given from the server within a predetermined period of time after the change of the network setting.

The technique described in Japanese Patent Laid-Open No. 2001-251337 is suitable for the case where the server is controlling the change of the network setting. However, the technique is not suitable for the case where a key role in changing the network setting is played not by the server, but by a customer at which an image forming apparatus is placed.

In a system where an image forming apparatus at a customer's site is remotely monitored, various services are provided on the basis of counter information and error information communicated from the image forming apparatus to a remote monitoring server via the Internet. Because a network setting of the image forming apparatus can be implemented easily by the customer on an operation screen of the image forming apparatus, a network breakdown easily occurs due to an incorrect or mistaken change of the setting. In the remote monitoring system, a user of the image forming apparatus does not generally pay attention to the fact that the remote monitoring server and the image forming apparatus are performing network communication with each other. Thus, such an incorrect change of the setting may be left for a while without being corrected. In contrast, since the remote monitoring server detects the occurrence of a network breakdown or the like on the basis of the presence of once-per-day regular communication from the image forming apparatus, there may be a maximum delay of one day from the occurrence to the detection of such a communication breakdown. The remote monitoring system must detect a network breakdown as soon as possible, specify the cause of the network breakdown, and prompts an appropriate person in charge of maintenance of the image forming apparatus to take appropriate measures to correct the network breakdown because of the characteristics of such services as error monitoring and toner inventory management at the image forming apparatus.

As in the related art, in case of network breakdown, it is not suitable for the image forming apparatus to recover the original setting or to display an error on a screen of the image forming apparatus because of the following reasons.

Since a change of the network setting of the image forming apparatus is implemented by a system administrator in change of customer information, changing the setting for the sake of the remote monitoring server can be regarded as ultra vires.

Further, in the case where an error is displayed when the image forming apparatus' print operation including a copy operation except for communication with the remote monitoring server is normal, the user may be misled into believing that the image forming apparatus is broken although the operation used by the user is normal. An exemplary network setting that does not influence the use of the image forming apparatus and that hinders communication between the image forming apparatus and the remote monitoring server is a proxy server. A proxy server is used to establish connection from an intranet environment to an Internet environment.

SUMMARY OF THE INVENTION

The present invention provides a monitoring apparatus that can quickly detect the occurrence of a communication breakdown due to a change of a network setting of an image forming apparatus, thereby maintaining the continuity of services.

The present invention also provides a monitoring apparatus that detects a communication breakdown and directly sends a notification of the recovering from the communication breakdown to an end-user using a notification tool such as an email sent from the monitoring apparatus.

A monitoring apparatus according to an aspect of the present invention includes a receiving unit configured to receive a notification of change of a network setting from an image forming apparatus, a determining unit configured to determine, after receipt of the notification of the change of the network setting by the receiving unit, whether a notification of completion of the change of the network setting is received within a predetermined period of time, and a notification unit configured to send a notification of a failure in the network setting in the case where the determining unit determines, after receipt of the notification of the change of the network setting by the receiving unit, that the notification of the completion of the change of the network setting is not received within the predetermined period of time.

An image forming apparatus according to another aspect of the present invention includes a first sending unit configured to send, in the case where a network setting is changed, a notification of the change of the network setting to a monitoring apparatus using the network setting before the change, a validating unit configured to validate, after sending the notification of the change of the network setting, the network setting after the change, and a second sending unit configured to send a notification of completion of the change of the network setting to the monitoring apparatus using the network setting after the change.

A monitoring system according to yet another aspect of the present invention includes an image forming apparatus and a monitoring apparatus. The image forming apparatus is configured to send, in the case where a network setting is changed, a notification of the change of the network setting to the monitoring apparatus using the network setting before the change, validate, after sending the notification of the change of the network setting, the network setting after the change, and send a notification of completion of the change of the network setting to the monitoring apparatus using the network setting after the change. The monitoring apparatus is configured to receive the notification of the change of the network setting from the image forming apparatus, determine, after receiving the notification of the change of the network setting, whether the notification of the completion of the change of the network setting is received within a predetermined period of time, and send a notification of a failure in the network setting in the case where it is determined that, after receipt of the notification of the change of the network setting, the notification of the completion of the change of the network setting is not received within the predetermined period of time.

Further features of the present invention will become apparent from the following description of exemplary embodiments with reference to the attached drawings.

BRIEF DESCRIPTION OF THE DRAWINGS

FIGS. 5A and 5B illustrate exemplary pieces of information communicated from the image forming apparatus to the remote monitoring server.

FIG. 6 illustrates exemplary data stored in the remote monitoring server for monitoring completion of a network setting.

FIG. 7 illustrates an exemplary network setting menu of the image forming apparatus.

FIG. 10 illustrates an exemplary email message sent by the remote monitoring server as to notification of a communication breakdown.

FIGS. 11A and 11B illustrate exemplary network setting menus of the image forming apparatus.

DESCRIPTION OF THE EMBODIMENTS

First Exemplary Embodiment

A first exemplary embodiment of the present invention will now herein be described below with reference to the drawings.

Image forming apparatuses placed at respective customers are connected to an intranet, and a remote monitoring server is connected to the Internet. Because of a firewall preventing attacks from the outside, information cannot be actively sent from the Internet to an intranet.

The present invention is implemented in the above-described environment. That is, the present invention is particularly effective in an environment where information can be sent from an image forming apparatus placed at a customer's site to a remote monitoring server, but information cannot be sent from the remote monitoring server to the image forming apparatus placed at the customer's site.

Figure 1:
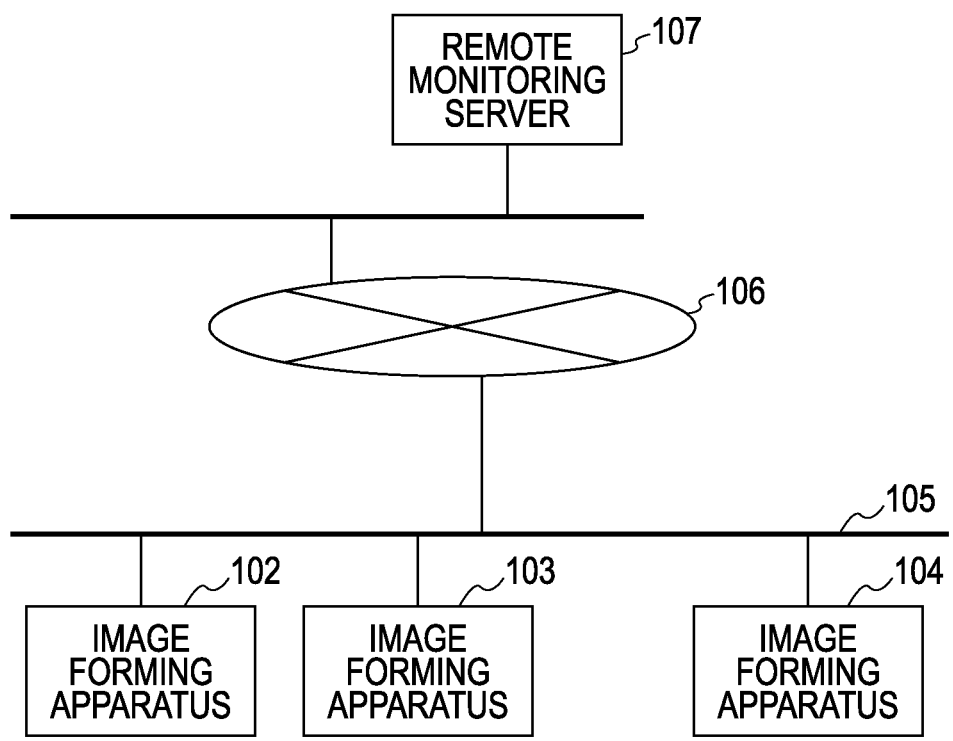
FIG. 1 is a block diagram of the entirety of a system according to an embodiment of the present invention.

FIG. 1 is a block diagram of the entirety of a system according to the present embodiment. The system includes apparatuses 102, 103, and 104 which are placed at respective locations and are connected to a network. These network-connected apparatuses include printers serving as image forming apparatuses (including electrophotographic and ink-jet printers), scanners, facsimile machines, digital multifunctional apparatuses integrating printer and facsimile functions, personal computers (PCs), servers, and the like. The image forming apparatuses 102, 103, and 104 will be discussed in more detail below. The image forming apparatuses 102, 103, and 104 can communicate with a remote monitoring server 107 via the Internet 106. The communication can be established using the Simple Mail Transfer Protocol (SMTP) or the Hypertext Transfer Protocol/Simple Object Access Protocol (HTTP/SOAP).

Although the image forming apparatuses 102, 103, and 104 will be discussed in more detail below, the image forming apparatuses 102, 103, and 104 communicate information indicating the occurrence and state of an error, the amount of toner remaining therein, the number of times a certain item is printed, or the like to the remote monitoring server 107 via a network 105 and the Internet 106.

Figure 2:
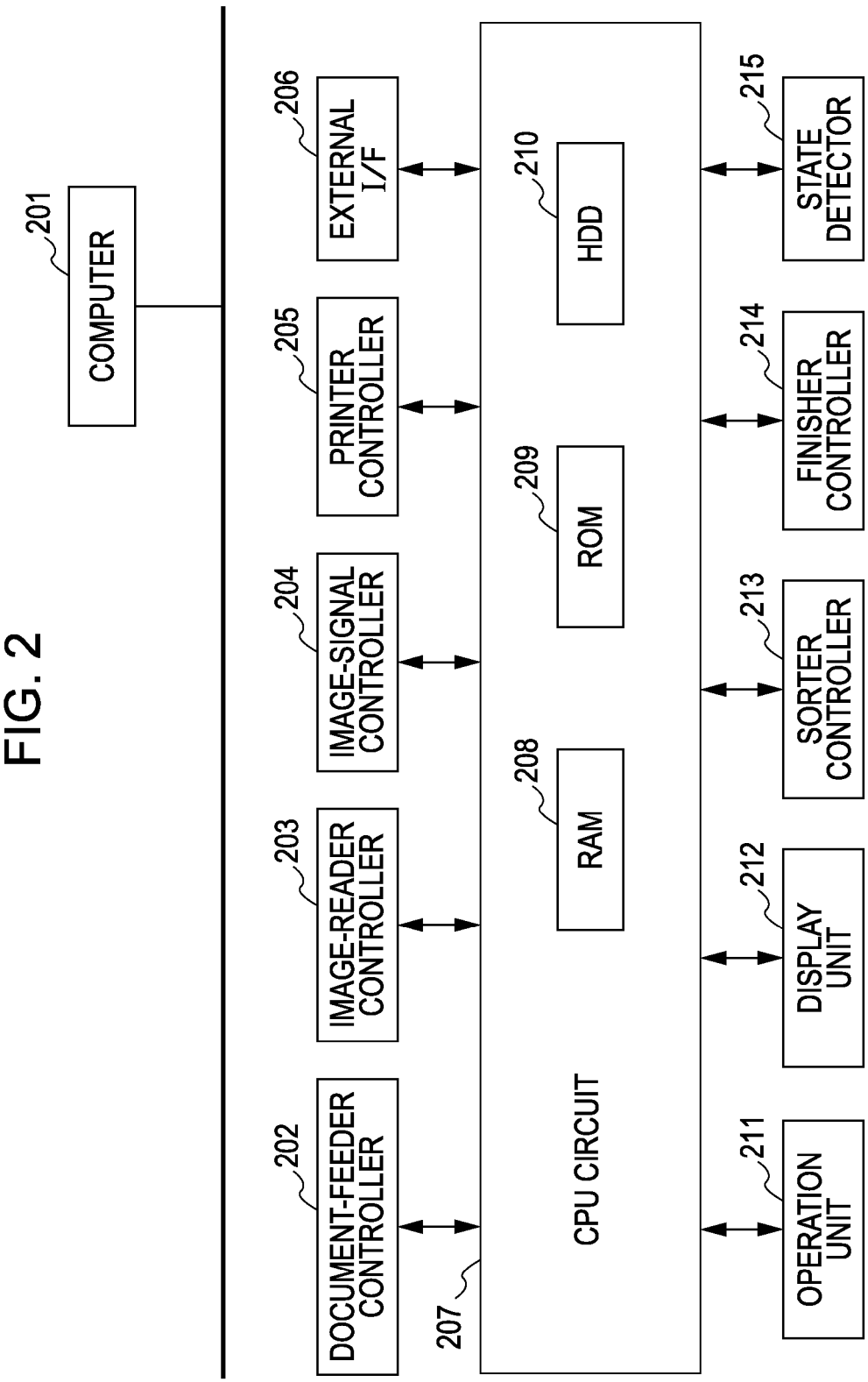
FIG. 2 is a block diagram of the configuration of a controller configured to control the entirety of an image forming apparatus.

FIG. 2 is a block diagram of the configuration of a controller configured to control the entirety of each image forming apparatus.

The controller includes a central processing unit (CPU) circuit 207. A CPU (not shown), a random access memory (RAM) 208, a read-only memory (ROM) 209, and a hard disk drive (HDD) 210 are connected to the CPU circuit 207. By executing a control program stored in the ROM 209, the CPU circuit 207 controls blocks 202, 203, 204, 205, 206, 211, 212, 213, 214, and 215 in an integrated manner. The RAM 208 temporarily stores control data and is used as a work area for arithmetic processing involved in implementing control. The HDD 210 stores information necessary for the control program and information received from the blocks 202, 203, 204, 205, 206, 211, 212, 213, 214, and 215.

The document-feeder controller 202 controls the driving of a document feeder (not shown) on the basis of an instruction from the CPU circuit 207. The image-reader controller 203 controls the driving of a scanner unit (not shown), an image sensor (not shown), and the like and transfers an analog image signal output from the image sensor to the image-signal controller 204.

The image-signal controller 204 converts the analog image signal into a digital signal, applies various processes to the digital signal to convert the digital signal into a video signal, and outputs the video signal to the printer controller 205. The external interface (I/F) 206 applies various processes to a digital image signal input from a computer 201 via a local area network (LAN) interface to convert the digital image signal into a video signal, and outputs the video signal to the printer controller 205. The external I/F 206 communicates with the remote monitoring server 107 (not shown) via the LAN interface. The operation of the image-signal controller 204 is under control of the CPU circuit 207. The printer controller 205 drives an exposure controller (not shown) on the basis of the input video signals.

The operation unit 211 includes a plurality of keys for entering settings of various functions relating to image formation, a display section configured to display information indicating the setting state, and the like. The operation unit 211 outputs a key signal corresponding to each key operation to the CPU circuit 207 and displays information corresponding to a signal from the CPU circuit 207 on the display unit 212.

The sorter controller 213 and the finisher controller 214 operate on the basis of signals from the CPU circuit 207 in accordance with a user input via the external I/F 206 or a setting entered through the operation unit 211. The state detector 215 collects state information from each component, determines whether an abnormal state or the like is detected, and reports the result to the CPU circuit 207. In accordance with the result reported, the CPU circuit 207 displays an abnormal state on the computer 201 or the like via the display unit 212 and the external I/F 206.

Figures 3, 4:
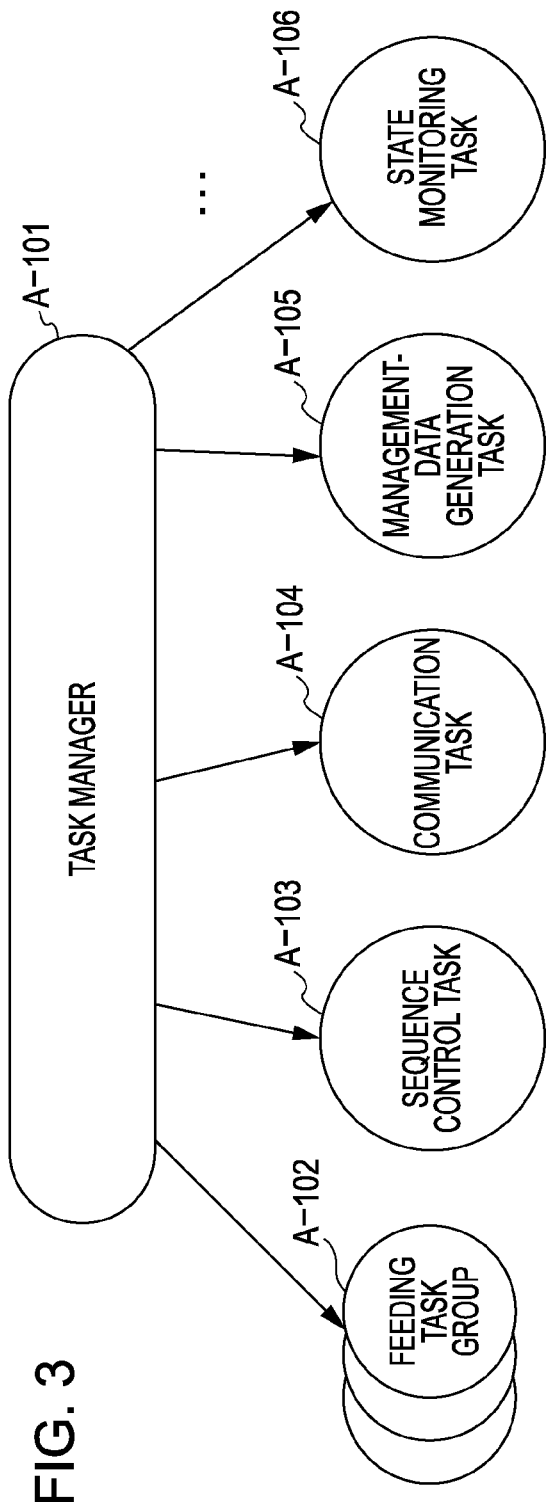
FIG. 3 is a software diagram of the image forming apparatus.
FIG. 4 illustrates an exemplary table stored in a remote monitoring server for managing image forming apparatuses being monitored.

FIG. 3 is a software diagram of each image forming apparatus.

A task manager A-101 is configured to simultaneously manage a plurality of tasks. A feeding task group A-102 is a task group being in change of feeding a document and a sheet on which an image is formed. A sequence control task A-103 is a task of managing the overall image forming apparatus. A communication task A-104 is a task of communicating with a remote monitoring server. A management-data generation task A-105 is a task of generating data for remote management according to the present embodiment.

In the image forming apparatus, the number of images formed is counted according to sheet size, mode, sheet type, and color. The count results are obtained by the management-data generation task A-105 and stored in a memory unit in the image forming apparatus.

Similarly, state information indicating a jam, error, alarm, or the like is stored in a predetermined data format in the memory unit in the image forming apparatus.

Each component of the image forming apparatus has a counter indicating the remaining life of a consumable item and a counter indicating the number of times the component is used (hereinafter referred to as a "component counter"). The count results obtained by the management-data generation task A-105 are stored in the memory unit in the image forming apparatus.

In the case where a state monitoring task A-106 of the image forming apparatus detects an abnormal state (jam, error, or alarm) in the image forming apparatus or a change in the state of a preset device, the management-data generation task A-105 stores the state in the memory unit in the image forming apparatus.

Figure 13:
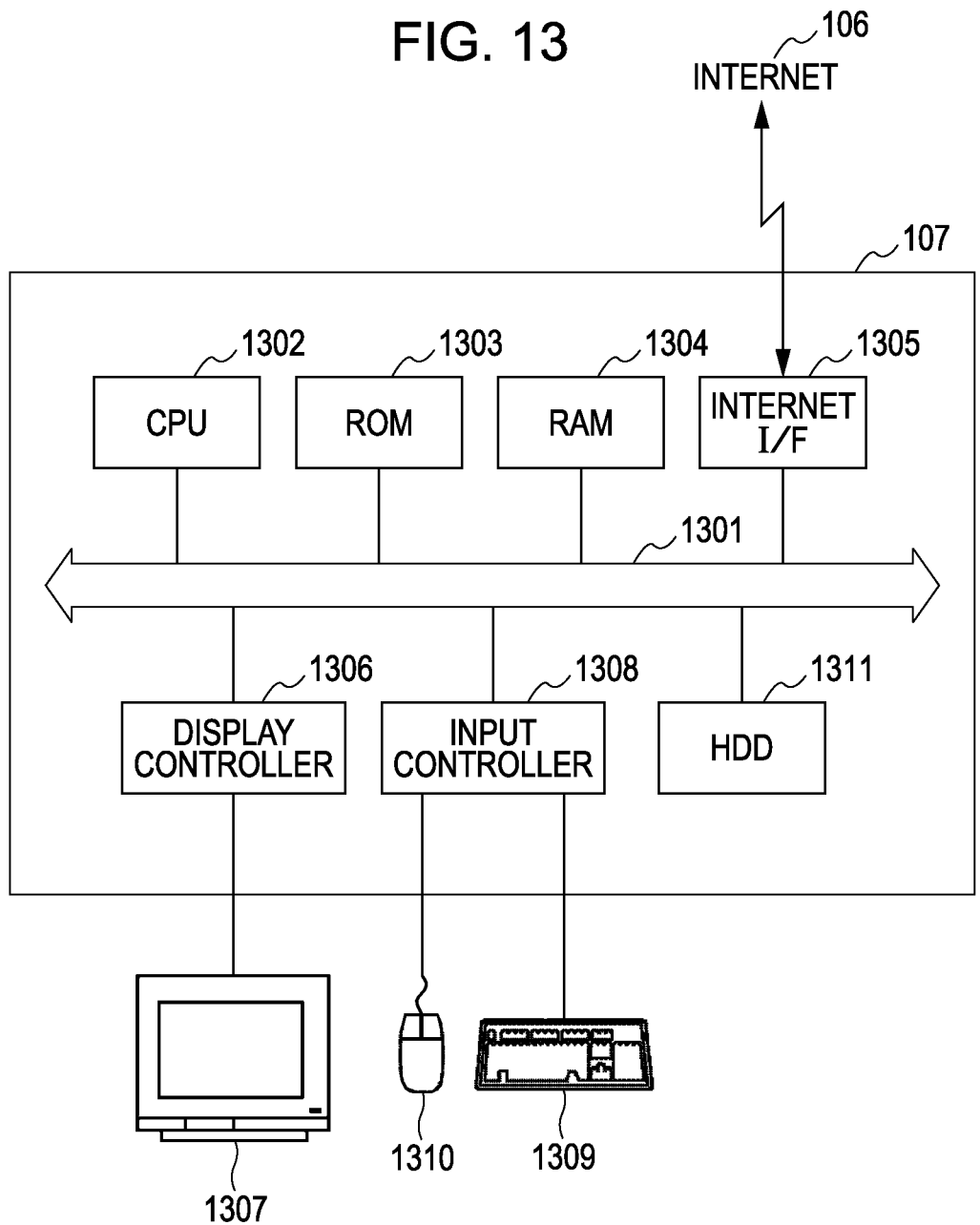
FIG. 13 is a hardware block diagram of the remote monitoring server.

FIG. 13 is a hardware block diagram of the remote monitoring server 107.

The remote monitoring server 107 includes a CPU 1302 configured to control the overall remote monitoring server 107 and a ROM 1303 serving as a read-only memory configured to store a boot program necessary for activating the system and a program executed by the remote monitoring server 107. The remote monitoring server 107 further includes a RAM 1304 serving as a work memory necessary for the CPU 1302 to execute a program, a network I/F 1305 configured to perform communication with the image forming apparatuses 102, 103, and 104 placed at the respective locations and a PC within an intranet of a sales company via the Internet 106, a display controller 1306, and an input controller 1308. In the remote monitoring server 107, an HDD 1311 storing a program executed by the CPU 1302 and operation information sent from the image forming apparatuses 102, 103, and 104 placed at the respective locations is connected to a system bus 1301. A display device 1307 is connected to the display controller 1306, and input devices 1309 and 1310 are connected to the input controller 1308. An operator serving as an administrator of the remote monitoring server 107 checks the operation state of the remote monitoring server 107 and gives operation instructions to the remote monitoring server 107 using these input/output devices.

The remote monitoring server 107 constantly receives information sent from the image forming apparatuses 102, 103, and 104 from the network I/F 1305 via the Internet 106, as has been described above. The remote monitoring server 107 parses extensible markup language (XML) data of the information received and stores the parsed data in the HDD 1311.

Figure 12:
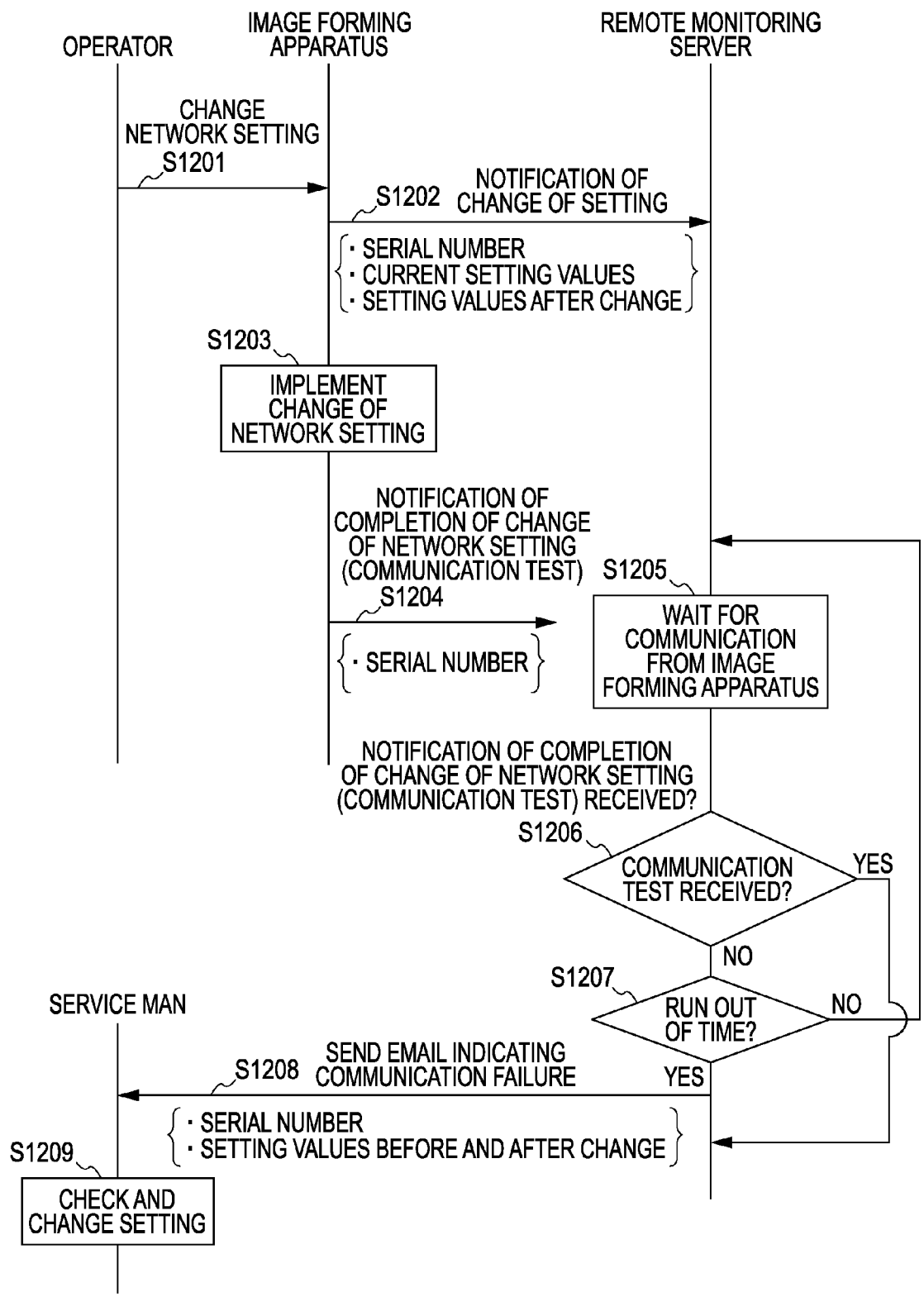
FIG. 12 illustrates a sequence of the operation of the remote monitoring server and the image forming apparatus.

The operation sequence of the remote monitoring server 107 and each of the image forming apparatuses 102, 103, and 104 (hereinafter collectively referred to as the "image forming apparatus") according to the present embodiment of the invention will be described using FIG. 12.

In step S1201, the operator gives to the image forming apparatus an instruction to change the network setting.

In step S1202, the image forming apparatus notifies the remote monitoring server 107 that the network setting of the image forming apparatus will be changed using the network setting before the change. Notification information includes a serial number serving as information specifying the image forming apparatus, the current network setting values, and network setting values specified in step S1201.

Upon receipt of the notification of the change of the network setting in step S1202, the remote monitoring server 107 waits for a communication test from the image forming apparatus in step S1205.

In contrast, after sending the notification of the change of the network setting in step S1202, the image forming apparatus implements the change of the network setting in step S1203.

Thereafter, in step S1204, the image forming apparatus sends a notification of completion of the change of the network setting (communication test data) to the remote monitoring server 107 using the network setting after the change. The notification of the completion of the change of the network setting (communication test data) includes the serial number. In case of failure in the network setting after the change (at least one of an internet protocol (IP) address, a subnet mask, a domain name system (DNS) server address, a proxy server address, and a gateway address is incorrect), the notification of the completion of the change of the network setting (communication test data) does not reach the remote monitoring server 107.

After receiving the notification of the change of the network setting from the image forming apparatus in step S1202, the remote monitoring server 107 waits for receipt of a notification of the completion of the change of the network setting (communication test data) from the image forming apparatus in step S1205.

In the case where the remote monitoring server 107 determines in step S1206 that the remote monitoring server 107 has received a notification of the completion of the change of the network setting (communication test data) from the image forming apparatus, the remote monitoring server 107 ends the monitoring process.

In the case where the remote monitoring server 107 determines in step S1206 that the remote monitoring server 107 has received no notification of the completion of the change of the network setting (communication test data) from the image forming apparatus, the remote monitoring server 107 determines in step S1207 whether a reception wait time has run out.

In the case where the remote monitoring server 107 determines that the reception wait time has run out, the remote monitoring server 107 sends in step S1208 an email indicating a breakdown of communication with the image forming apparatus to a service man in charge of maintenance of the image forming apparatus. The email includes the serial number and the network setting values before and after the change.

In the case where the remote monitoring server 107 determines in step S1207 that the reception wait time has not run out, the flow returns to step S1205, and the remote monitoring server 107 waits for receipt of data from the image forming apparatus.

On the basis of the contents of the email sent from the remote monitoring server 107 in step S1208, the service man checks in step S1209 the network setting of the image forming apparatus and, as needed, changes the network setting.

Using FIGS. 4 to 10, a method of detecting a change of a network setting will now herein be described in detail.

FIG. 4 illustrates exemplary information stored in the remote monitoring server 107 for managing image forming apparatuses being monitored.

The information stored includes an identification (ID) specifying the image forming apparatus and a sending address to which a failure is reported in case of a breakdown of network communication. The ID may be a serial number or a media access control (MAC) address specifying the image forming apparatus.

The network setting is changed by a customer's information technology (IT) administrator. However, it is preferable that a breakdown of communication with the remote monitoring server 107 be repaired not by the customer, but by the service provider. For this reason, the sending address stored is the email address of a person in charge of maintenance of each image forming apparatus. However, the present invention is applicable to the case where the sending address is the address of the customer's IT administrator.

The information stored may further include accompanying information of each image forming apparatus, such as a product name, customer ID, contract information (not shown), and the like.

FIGS. 5A and 5B illustrate examples of SOAP schemas of a notification of the change of the network setting and a notification of the completion of the change of the network setting sent from the image forming apparatus to the remote monitoring server 107. FIG. 5A illustrates an exemplary notification of the change of the network setting, and FIG. 5B illustrates an exemplary notification of the completion of the change of the network setting.

In FIG. 5A, "serialNumber" serves as information specifying the image forming apparatus; network setting values before the change are set in "ip", "gateway", "dns", "proxy", and "wins"; and network setting values after the change are set in "ipNew", "gatewayNew", "dnsNew", "proxyNew", and "winsNew". Further, "timeStamp" includes the sending time of the notification of the change. In this example, the proxy server address is instructed by the image forming apparatus to be changed from "10.2.1.1", which is set in the proxy tag, to "10.2.1.5", which is set in the "proxyNew".

FIG. 5B includes "serialNumber" serving as information specifying the image forming apparatus and the sending time of the notification of the completion of the change.

The present invention is applicable to the case in which network setting information includes, besides the IP address, the gateway address, the DNS server address, the proxy server address, and the Windows Internet Name Services (WINS) server address, general network setting items including a subnet mask.

FIG. 6 illustrates exemplary items of work data stored in the remote monitoring server 107 in the case where the remote monitoring server 107 receives a notification of the change of the network setting from the image forming apparatus, the work data being stored to monitor the notification of the completion of the change of the network setting.

The number of apparatuses waiting for the completion is the number of image forming apparatuses having sent a notification of the change of the network setting. The number of apparatuses waiting for the completion is counted up when a notification of the change of the network setting is received. The number of apparatuses waiting for the completion is counted down when a notification of the completion of the change of the network setting is received or a monitoring end time has been reached, that is, the time has run out.

For each image forming apparatus, the ID, the setting values before the change, the setting values after the change, the monitoring start time, and the monitoring end time are stored. The stored setting values before and after the change are items relating to network communication, such as the IP address, the default gateway address, the DNS server address, the proxy server address, and the WINS server address.

The present invention is applicable to the case in which, instead of the monitoring end time, the reception wait time and the number of times the remote monitoring server 107 has waited for receipt of a notification are stored.

FIG. 7 illustrates an exemplary network setting menu displayed on an operation screen of the image forming apparatus. The network setting menu is displayed in the case where an instruction to change the network setting is given on the operation screen.

The current network setting values are displayed as setting values of the network items of the network setting menu.

In the case where an OK button is pressed, setting values specified on the operation screen are validated as setting values after the change. The setting-value change operation will be described later using FIG. 8.

In the case where a cancel button is pressed, setting values specified on the operation screen become invalid, and the network-setting change operation is not performed.

Figure 8:
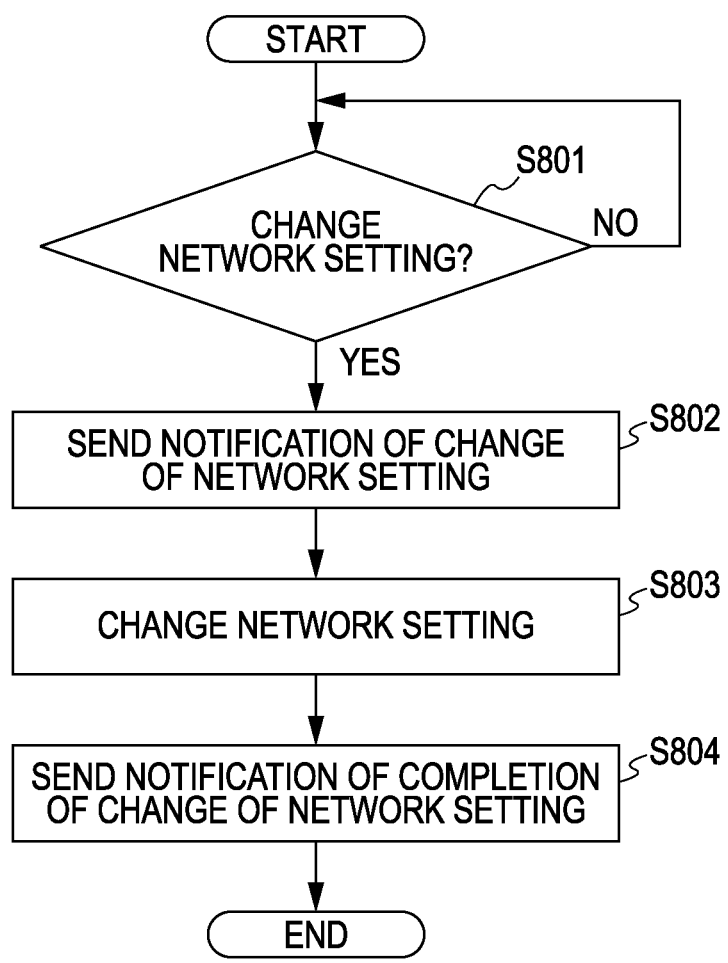
FIG. 8 is a flowchart of the network-setting change operation of the image forming apparatus.

FIG. 8 is a flowchart of the network-setting change operation of the image forming apparatus.

A program relating to the flowchart shown in FIG. 8 is stored in the ROM 209 of the image forming apparatus and executed by the CPU circuit 207.

In the case where it is determined in step S801 that the network setting has been changed through the operation unit 211, setting values set in the network setting menu shown in FIG. 7 are saved in the RAM 208, and the processing in step S802 is performed. In step S801, the network setting values are changed by a user on the network setting screen shown in FIG. 7, which is displayed on the display unit 212. In the case where the pressing of the OK button on the network setting screen shown in FIG. 7 is detected, it is determined that the setting has been changed.

In step S802, network-setting change notification data shown in FIG. 5A is generated from the network setting values saved in the HDD 210 or in a flash ROM or static RAM (SRAM), which is a nonvolatile recording medium as in the HDD 210. The generated network-setting change notification data serving as a notification of the change of the network setting is sent to the remote monitoring server 107 via the external I/F 206 using a network setting before the change. Sending-address information for sending data to the remote monitoring server 107 is stored in the HDD 210 or in the flash ROM or SRAM, which is a nonvolatile recording medium as in the HDD 210. The generation of the notification data is performed by the management-data generation task A-105, and the notification thereof is performed by the communication task A-104. The generation time of the notification data is set in "timeStamp".

In step S803, the network setting values saved in the RAM 208 replace those saved in the HDD 210 or in the flash ROM or SRAM, which is a nonvolatile recording medium as in the HDD 210, thereby validating the new setting values as the network setting of the image forming apparatus.

In step S804, a notification of the completion of the change of the network setting shown in FIG. 5B is sent to the remote monitoring server 107 using the network setting after the change. As in step S803, the generation and sending of the notification data are performed by the management-data generation task A-105 and the communication task A-104, respectively. The generation time of the notification data is set in "timeStamp".

Figure 9:
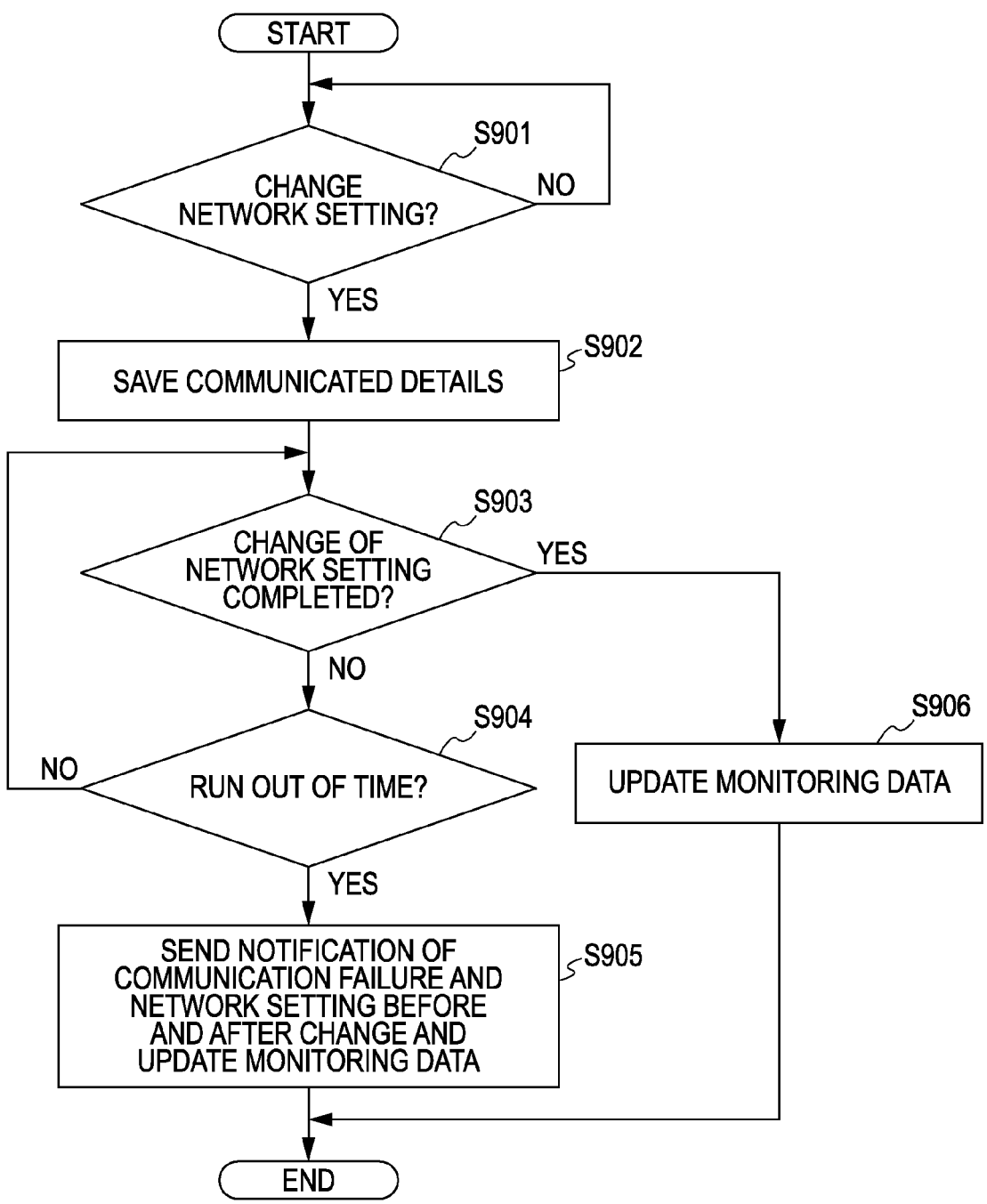
FIG. 9 is a flowchart of the operation of the remote monitoring server after receiving a notification of change of the network setting.

FIG. 9 is a flowchart of the operation of the network monitoring server 107 after receiving a notification of the change of the network setting.

A program relating to the flowchart shown in FIG. 9 is stored in the ROM 1303 of the remote monitoring server 107 and executed by the CPU 1302.

In the case where it is determined in step S901 that the data received is a notification of the change of the network setting shown in FIG. 5A, the processing in step S902 is performed. In the case where it is determined that the data received is not a notification of the change of the network setting, the remote monitoring server 107 enters a wait state for notification data.

In step S902, the contents of the notification data are saved in the format shown in FIG. 6.

The number of apparatuses waiting for the completion is counted up by one. Next, "serialNumber" in the communication data is saved as ID. Further, "ip", "gateway", "dns", "proxy", and "wins" in the communication data are saved as setting values before the change. Further, "ipNew", "gatewayNew", "dnsNew", "proxyNew", and "winsNew" are saved as setting values after the change.

The time at which the remote monitoring server 107 received the notification of the change of the network setting is set as the monitoring start time.

The monitoring end time is set by adding a value taking into consideration the time needed to send data from the image forming apparatus and the time needed to change the network setting of the image forming apparatus to the monitoring start time.

The time needed to send data from the image forming apparatus can be easily calculated from "timeStamp" included in the notification data and the reception time of the notification data in the remote monitoring server 107.

The time needed to change the network setting of the image forming apparatus can be easily obtained by maintaining it by the remote monitoring server 107 for each product.

Note that the above-mentioned values are not essential in setting the monitoring end time. Alternatively, a fixed value based on statistical information may be added to the monitoring start time.

In step S903, the remote monitoring server 107 waits for receipt of a notification of the completion of the change of the network setting for a predetermined period of time. Step S903 is performed in the case where it is determined that the current time is the same as or exceeds the monitoring start time. In the case where the monitoring start time is after the current time, step S903 is not performed.

In the case where it is determined that a notification of the completion of the change of the network setting is received, the processing is performed in step S906 to delete monitoring data saved in step S902.

In step S906, the ID corresponding to "serialNumber", the setting values before and after the change, the monitoring start time, and the monitoring end time included in the notification of the completion of the change of the network setting sent from the image forming apparatus are deleted, and the number of apparatuses waiting for the completion is reduced by one. Thus, the monitoring process ends.

In the case where it is determined in step S903 that no notification of the completion of the change of the network setting is received from the image forming apparatus, the processing from step S903 onward is performed.

In step S904, the current time is compared with the monitoring end time. When it is determined that the current time has not exceeded the monitoring end time, the flow returns to step S903, and the remote monitoring server 107 waits for receipt of a notification of the completion of the change of the network setting from the image forming apparatus.

In the case where it is determined in step S904 that the current time has exceeded the monitoring end time, the processing in step S905 is performed.

In step S905, an email which contains the contents shown in FIG. 10 to indicate a failure in the network setting is generated from data including the ID stored in the format shown in FIG. 6 corresponding to the image forming apparatus, reception from which has been being monitored, and data stored in the format shown in FIG. 4, and the email is sent to a corresponding sending address.

Further, data corresponding to the image forming apparatus, reception from which has been being monitored, is deleted from the monitoring data shown in FIG. 6, and the number of apparatuses waiting for the completion is reduced by one.

In the above description, whether the time has run out is determined in step S904 on the basis of the current time and the monitoring end time. However, as has been discussed in the description of FIG. 6, whether the time has run out can be determined on the basis of the number of times the remote monitoring server 107 has waited for receipt of a notification. By performing the processing in steps S903 and S904, after receipt of a notification of the change of the network setting, whether a notification of the completion of the change of the network setting is received within the predetermined period of time is determined.

FIG. 10 illustrates an exemplary email message sent in the case where a communication breakdown is detected, thereby reporting the breakdown.

A serial number in the email message corresponds to the ID shown in FIG. 6. Settings before and after the change are generated from the stored information shown in FIG. 6.

As has been described above, the remote monitoring server 107 can monitor the image forming apparatus for communication breakdowns after the change of the network setting. Accordingly, in case of a communication breakdown, information necessary for quickly repairing the communication breakdown can be sent to a person in charge of maintenance of the image forming apparatus, thereby avoiding an interruption in the continuity of services.

Second Exemplary Embodiment

The operation of the image forming apparatus to send notifications to the remote monitoring server 107 in the case where the time of sending a notification of the change of the network setting and a notification of the completion of the change of the network setting from the image forming apparatus to the remote monitoring server 107 is changed by the image forming apparatus will now herein be described in detail with reference to FIGS. 8, 11A, and 11B.

FIGS. 11A and 11B illustrate exemplary network setting menus displayed on the operation screen of the image forming apparatus.

In the case where a "details" button shown in FIG. 11A is pressed, a screen for changing the time of changing the network setting and the time of sending a notification of the completion of the change of the network setting is displayed, as shown in FIG. 11B.

In the case where "delayed notification of completion of change" is selected in FIG. 11B, the time and date on which a notification of the completion of the change of the network setting is sent to the remote monitoring server 107 is specified as "notification time and date".

In the case where "reserved change" is selected in FIG. 11B, the time and date on which a network setting specified in FIG. 11A is validated is specified as "change time and date".

In the case where "delayed notification of completion of change after change" is selected in FIG. 11B, the time and date on which a notification of the completion of the change of the network setting is sent to the remote monitoring server 107 is specified as "notification time and date".

In FIG. 11B, the following four patterns of settings can be specified.

Pattern 1 corresponds to a combination of "immediate change" and "immediate notification of completion of change". In the case where an "OK" button is pressed in FIG. 11A, the image forming apparatus immediately sends a notification of the change of the network setting to the remote monitoring server 107, changes the network setting thereof, and sends a notification of the completion of the change of the network setting to the remote monitoring server 107.

Pattern 2 corresponds to a combination of "immediate change" and "delayed notification of completion of change". In the case where the "OK" button is pressed in FIG. 11A, the image forming apparatus immediately sends a notification of the change of the network setting to the remote monitoring server 107, and changes the network setting thereof. The image forming apparatus sends a notification of the completion of the change of the network setting to the remote monitoring server 107 when the current time and date reach the notification time and date.

Pattern 3 corresponds to a combination of "reserved change" and "immediate notification of completion of change after change". In the case where the "OK" button is pressed in FIG. 11A, the image forming apparatus waits until the change time and date. When the current time and day reach the change time and day, the image forming apparatus sends a notification of the change of the network setting to the remote monitoring server 107, and changes the network setting thereof. When the change is completed, the image forming apparatus sends a notification of the completion of the change of the network setting to the remote monitoring server 107.

Pattern 4 corresponds to a combination of "reserved change" and "delayed notification of completion of change after change". In the case where the "OK" button is pressed in FIG. 11A, the image forming apparatus waits until the change time and date. When the current time and day reach the change time and day, the image forming apparatus sends a notification of the change of the network setting to the remote monitoring server 107, and changes the network setting thereof. The image forming apparatus sends a notification of the completion of the change of the network setting to the remote monitoring server 107 when the current time and date reach the sending date (or the notification date) of the notification of the completion of the change.

The operation in the case of patterns 1 to 4 will now herein be described below.

In the case of pattern 1, the operation of the image forming apparatus is not different from that described in the first exemplary embodiment.

In the case of pattern 2, the operation of the image forming apparatus will be described using FIG. 8.

In the case where it is determined in step S801 that the network setting has been changed through the operation unit 211, the setting values specified in FIGS. 11A and 11B are saved in the RAM 208, and the processing in step S802 is performed.

In step S802, network-setting change notification data shown in FIG. 5A is generated from network setting values stored in the HDD 210 or in the flash ROM or SRAM, which is a nonvolatile recording medium as in the HDD 210. The generated network-setting change notification data serving as the notification of the change of the network setting is sent to the remote monitoring server 107 via the external I/F 206 using the network setting before the change. Sending-address information for sending data to the remote monitoring server 107 is stored in the HDD 210 or in the flash ROM or SRAM, which is a nonvolatile recording medium as in the HDD 210. The generation of the notification data is performed by the management-data generation task A-105, and the notification thereof is performed by the communication task A-104. The notification time and date of the delayed notification of the completion of the change are set in "timeStamp". Because the notification time and date of the delayed notification of the completion of the change in "timeStamp" are sent to the remote monitoring server 107, the remote monitoring server 107 performs processing in step S902 to set the notification time and date of the delayed notification of the completion of the change in "timeStamp" as the monitoring end time shown in FIG. 6. In the case where the current time has reached the monitoring end time (notification time and date of the delayed notification of the completion of the change) in step S904, it is determined that the time has run out.

In step S803, the network setting values saved in the RAM 208 replace those saved in the HDD 210 or in the flash ROM or SRAM, which is a nonvolatile recording medium as in the HDD 210, thereby validating the new setting values as the network setting of the image forming apparatus.

In step S804, a notification of the completion of the change of the network setting shown in FIG. 5B is sent to the remote monitoring server 107 using the network setting after the change. As in step S803, the generation and sending of the notification data are performed by the management-data generation task A-105 and the communication task A-104, respectively. The generation time of the notification data is set in "timeStamp".

Step S804 is performed in the case where it is determined that the current time is the same as or exceeds the notification time and date of the "delayed notification of the completion of the change" specified in FIG. 11B. Until the above-mentioned condition is satisfied, step S804 is not performed.

The operation of the image forming apparatus in the case of pattern 3 will be described using FIG. 8.

In the case where it is determined in step S801 that the network setting has been changed through the operation unit 211, the setting values specified in FIGS. 11A and 11B are saved in the RAM 208.

The processing in step S802 is performed in the case where the current time is the same as or exceeds the change time and date of the reserved change. In the case where the current time is before the reserved change time and date, the image forming apparatus waits until the reserved change time and date.

In step S802, network-setting change notification data shown in FIG. 5A is generated from network setting values stored in the HDD 210 or in the flash ROM or SRAM, which is a nonvolatile recording medium as in the HDD 210. The generated network-setting change notification data serving as the notification of the change of the network setting is sent to the remote monitoring server 107 via the external I/F 206 using the network setting before the change. Sending-address information for sending data to the remote monitoring server 107 is stored in the HDD 210 or in the flash ROM or SRAM, which is a nonvolatile recording medium as in the HDD 210. The generation of the notification data is performed by the management-data generation task A-105, and the notification thereof is performed by the communication task A-104. The generation time of the notification data is set in "timeStamp".

In step S803, the network setting values saved in the RAM 208 replace those saved in the HDD 210 or in the flash ROM or SRAM, which is a nonvolatile recording medium as in the HDD 210, thereby validating the new setting values as the network setting of the image forming apparatus.

In step S804, a notification of the completion of the change of the network setting shown in FIG. 5B is sent to the remote monitoring server 107 using the network setting after the change. As in step S803, the generation and sending of the notification data are performed by the management-data generation task A-105 and the communication task A-104, respectively. The generation time of the notification data is set in "timeStamp".

Finally, the operation of the image forming apparatus in the case of pattern 4 will be described using FIG. 8.

In the case where it is determined in step S801 that the network has been changed through the operation unit 211, the setting values specified in FIGS. 11A and 11B are saved in the RAM 208.

The processing in step S802 is performed in the case where the current time is the same as or exceeds the change time and date of the reserved change. In the case where the current time is before the reserved change time and date, the image forming apparatus waits until the reserved change time and date.

In step S802, network-setting change notification data shown in FIG. 5A is generated from network setting values stored in the HDD 210 or in the flash ROM or SRAM, which is a nonvolatile recording medium as in the HDD 210. The generated network-setting change notification data serving as the notification of the change of the network setting is sent to the remote monitoring server 107 via the external I/F 206 using the network setting before the change. Sending-address information for sending data to the remote monitoring server 107 is stored in the HDD 210 or in the flash ROM or SRAM, which is a nonvolatile recording medium as in the HDD 210. The generation of the notification data is performed by the management-data generation task A-105, and the notification thereof is performed by the communication task A-104. The generation time of the delayed notification of the completion of the change is set in "timeStamp".

In step S803, the network setting values saved in the RAM 208 replace those saved in the HDD 210 or in the flash ROM or SRAM, which is a nonvolatile recording medium as in the HDD 210, thereby validating the new setting values as the network setting of the image forming apparatus.

In step S804, a notification of the completion of the change of the network setting shown in FIG. 5B is sent to the remote monitoring server 107 using the network setting after the change. As in step S803, the generation and sending of the notification data are performed by the management-data generation task A-105 and the communication task A-104, respectively. The generation time of the notification data is set in "timeStamp".

Step S804 is performed in the case where it is determined that the current time is the same as or exceeds the notification time and date of the "delayed notification of the completion of the change" specified in FIG. 11B. Until the above-mentioned condition is satisfied, step S804 is not performed.

As has been described above, the following advantages are achieved since the time of changing the network setting of the image forming apparatus and the time of sending a notification of the change of the network setting and a notification of the completion of the change of the network setting to the remote monitoring server 107 can be changed.

There may be a situation where communication cannot be performed using a current network setting at the time the image forming apparatus performs a network setting operation, or a situation where communication can be performed using a current network setting though the current time is prior to the validation of a network setting after the change. Even in such situations, there may be more occasions where the remote monitoring server 107 can detect communication breakdowns.

According to the embodiments of the present invention, the occurrence of a communication breakdown due to the change of the network setting of an image forming apparatus can be readily detected by the remote monitoring server 107, thereby maintaining the continuity of services. The remote monitoring server 107 can detect a communication breakdown and notify a service man by sending an email indicating that the communication breakdown occurred at a customer's site and measures against the network breakdown must be taken, in addition to sending information before and after the change of the network setting. Because the service man is notified of these pieces of information, the service man can quickly repair the communication breakdown.

According to the embodiments of the present invention, the occurrence of a communication breakdown due to the change of the network setting of an image forming apparatus can be readily detected by a monitoring apparatus, thereby maintaining the continuity of services.

Since such a communication breakdown is detected by the monitoring apparatus, the recovering from the communication breakdown can be directly communicated to an end-user using a notification tool such as an email sent from the monitoring apparatus.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-332177 filed Dec. 8, 2006, which is hereby incorporated by reference herein in its entirety.

What is claimed is:

1. A monitoring apparatus comprising:
   a receiving unit configured to receive a first network setting value of an image forming apparatus after a change of a network setting and a second network setting value of the image forming apparatus before the change from the image forming apparatus;
   a determining unit configured to determine, after receipt of the first network setting value and the second network setting value by the receiving unit, whether a notification of completion of the change of the network setting is received within a predetermined period of time; and
   a sending unit configured to send an email that contains the first network setting value and the second network setting value to an email address corresponding to the image forming apparatus in a case where the determining unit determines, after receipt of the first network setting value and the second network setting value by the receiving unit, that the notification of the completion of the change of the network setting is not received within the predetermined period of time.

2. The monitoring apparatus according to claim 1, wherein the first network setting value and the second network setting value comprises at least one value of an IP address, a gateway address, a DNS server address, a proxy server address, a Windows Internet Name Services (WINS) server address and a subnet mask.

3. A monitoring system comprising an image forming apparatus and a monitoring apparatus,
  wherein the image forming apparatus is configured to
    send, in the case where a network setting is changed, a first network setting value of the image forming apparatus after a change of the network setting and a second network setting value of the image forming apparatus before the change to the monitoring apparatus,
    validate, after sending the first network setting value and the second network setting value, the first network setting value, and
    send a notification of completion of the change of the network setting to the monitoring apparatus using the first network setting value, and
  wherein the monitoring apparatus is configured to
    receive the first network setting value and the second network setting value from the image forming apparatus,
    determine, after receipt of the first network setting value and the second network setting value, whether the notification of the completion of the change of the network setting is received within a predetermined period of time, and
    send an email that contains the first network setting value and the second network setting value to an email address corresponding to the image forming apparatus in a case where it is determined that, after receipt of the first network setting value and the second network setting value, the notification of the completion of the change of the network setting is not received within the predetermined period of time.

4. The monitoring system according to claim 3,
  wherein the first network setting value and the second network setting value comprises at least one value of an IP address, a gateway address, a DNS server address, a proxy server address, a Windows Internet Name Services (WINS) server address and a subnet mask.

5. A method of changing a network setting, the method comprising:
  receiving a first network setting value of an image forming apparatus after a change of the network setting and a second network setting value of the image forming apparatus before the change from the image forming apparatus;
  determining, after receiving the first network setting value and the second network setting value, whether a notification of completion of the change of the network setting is received within a predetermined period of time; and
  sending an email that contains the first network setting value and the second network setting value to an email address corresponding to the image forming apparatus in a case where it is determined that, after receiving the first network setting value and the second network setting value, the notification of the completion of the change of the network setting is not received within the predetermined period of time.

6. The method according to claim 5,
  wherein the first network setting value and the second network setting value comprises at least one value of an IP address, a gateway address, a DNS server address, a proxy server address, a Windows Internet Name Services (WINS) server address and a subnet mask.

7. A non-transitory computer-readable storage medium storing computer-executable process steps, the computer-executable process steps causing a computer to execute the method of claim 5.

8. The non-transitory computer-readable storage medium according to claim 7,
  wherein the first network setting value and the second network setting value comprises at least one value of an IP address, a gateway address, a DNS server address, a proxy server address, a Windows Internet Name Services (WINS) server address and a subnet mask.

9. A method of changing a network setting in a monitoring system including an image forming apparatus and a monitoring apparatus, the method comprising:
  sending, by the image forming apparatus, in the case where the network setting is changed, a first network setting value of the image forming apparatus after a change of the network setting and a second network setting value of the image forming apparatus before the change to the monitoring apparatus;
  validating, by the image forming apparatus, after sending the first network setting value and the second network setting value, the first network setting value;
  sending, by the image forming apparatus, a notification of completion of the change of the network setting to the monitoring apparatus using the first network setting value;
  receiving, by the monitoring apparatus, the first network setting value and the second network setting value from the image forming apparatus;
  determining, by the monitoring apparatus, after receipt of the first network setting value and the second network setting value, whether the notification of the completion of the change of the network setting is received within a predetermined period of time; and
  sending, by the monitoring apparatus, an email that contains the first network setting value and the second network setting value to an email address corresponding to the image forming apparatus in a case where it is determined that, after receipt of the first network setting value and the second network setting value, the notification of the completion of the change of the network setting is not received within the predetermined period of time.

10. The method according to claim 9,
  wherein the first network setting value and the second network setting value comprises at least one value of an IP address, a gateway address, a DNS server address, a proxy server address, a Windows Internet Name Services (WINS) server address and a subnet mask.

11. A non-transitory computer-readable storage medium storing computer-executable process steps, the computer-executable process steps causing a computer to execute the method of claim 9.

\* \* \* \* \*